United States Patent
Fish et al.

(10) Patent No.: US 8,811,964 B2
(45) Date of Patent: Aug. 19, 2014

(54) SINGLE BUTTON MOBILE TELEPHONE USING SERVER-BASED CALL ROUTING

(75) Inventors: Ram David Adva Fish, Menlo Park, CA (US); Henry Messenger, Campbell, CA (US)

(73) Assignee: Numera, Inc., Seattle, WA (US)

( * ) Notice: Subject to any disclaimer, the term of this patent is extended or adjusted under 35 U.S.C. 154(b) by 72 days.

(21) Appl. No.: 13/439,571

(22) Filed: Apr. 4, 2012
(Under 37 CFR 1.47)

(65) Prior Publication Data
US 2012/0322430 A1    Dec. 20, 2012

Related U.S. Application Data

(60) Provisional application No. 61/516,478, filed on Apr. 4, 2011.

(51) Int. Cl.
*H04W 4/00*    (2009.01)

(52) U.S. Cl.
USPC ........................... 455/417; 455/404.1

(58) Field of Classification Search
USPC .............. 455/404.1, 404.2, 403, 417, 452.1
See application file for complete search history.

(56) References Cited

U.S. PATENT DOCUMENTS

2009/0023425 A1*  1/2009  Hosain et al. ............. 455/412.1

* cited by examiner

*Primary Examiner* — Sam Bhattacharya
(74) *Attorney, Agent, or Firm* — Lowenstein Sandler LLP (57) ABSTRACT

A user may carry a wearable device and may push a button on the wearable device to initiate a voice call. A computing system receives the request to initiate a voice call and may analyze datasets provided by the wearable device. The computing system may dynamically route voice calls to different destinations based on datasets received from a wearable device.

20 Claims, 7 Drawing Sheets

SINGLE BUTTON MOBILE TELEPHONE USING SERVER-BASED CALL ROUTING

CROSS-REFERENCE TO RELATED APPLICATION

This application claims the benefit of U.S. Provisional Patent Application No. 61/516,478 filed Apr. 4, 2011, the disclosure of which is incorporated herein by reference in its entirety.

TECHNICAL FIELD

Embodiments of the present invention relate generally to health care-based monitoring systems, and more specifically, to a system and method for routing voice calls from a wearable device to one or more destinations.

BACKGROUND

For certain age groups, such as the elderly, or people that engage in certain dangerous activities, such as firefighters and soldiers, it is desirable to track and understand human activity automatically. For example, a person that has fallen may be injured, unconscious, etc., and needs emergency assistance. In such circumstances, relying on the person to initiate a call to a public safety access point (PSAP) (e.g., 9-1-1 emergency services, an automated emergency call center, etc.) is not practical. Moreover, even if the person is capable of placing the call, the PSAP may be located outside the geographical jurisdiction for providing emergency services. An emergency services person located at a PSAP may need to manually place a second call to the local fire station, police, or Emergency Medical Services (EMS) squad, thereby wasting precious time that could be used to save the person's life. Further, if the person is unconscious, they would not be able to relate the nature of their injuries nor their physical location.

A wearable device may be worn by the user and the wearable device may monitor the activities and/or health of the user using a variety of sensors and/or components (e.g., GPS units, a blood pressure unit, an accelerometer, etc.). The wearable device may also provide a simple interface (e.g., a single button) to allow a user to initiate a voice call (e.g., to request help). However, these simplified interfaces (e.g., the single button) may not allow a user to choose a destination for the voice call. The wearable device may be configured to call a single destination (e.g., a PSAP) in response to a user request (e.g., in response to the user pushing the button) and may not be able to initiate voice calls to other destinations in response to the user request.

BRIEF DESCRIPTION OF THE DRAWINGS

Embodiments of present invention will be more readily understood from the detailed description of exemplary embodiments presented below considered in conjunction with the attached drawings.

DETAILED DESCRIPTION

Embodiments of the invention provide an apparatus wearable by a user for automatically contacting a public safety access point (PSAP). The wearable device includes several sensors for obtaining datasets. One of datasets is a location of a user obtained from an aGPS receiver. The wearable device also includes a cellular transceiver. The cellular transceiver transmits the datasets to a cloud computing system, receives emergency assistance instructions from the cloud computing system, and contacts a safety access point (PSAP) (e.g., 9-1-1 emergency services, an automated emergency call center, etc.) based on one or more of the location of the user, data/datasets received from the wearable device, and a subscription level/account of a user. The wearable device further includes a button which the user may use (e.g., by pressing the button) to initiate a voice call.

In one embodiment, the cloud computing system is configured to receive datasets of raw measurements based on an event from the wearable device via the network, where one of the datasets is audio. In one embodiment, the datasets may include audio recoded by an audio capturing module such as microphones; and one or both of acceleration from an accelerometer and change in orientation (e.g., rotation angles change) calculated based on accelerometer, magnetometer and gyroscope measurements. The audio data may originate from the user's voice, the user's body, and the environment. Optionally, the datasets may include data received from other sensors, such as data from external health sensors (e.g., an EKG, blood pressure device/sphygmomanometer, a weight scale, a glucometer, a pulse oximeter). The clouding computing system may determine whether the event is an activity of daily life (ADL), a fall or other type of accident, or an inconclusive event.

In one embodiment, the cloud computing system may route the voice call to a destination, based on the datasets and audio data received from the wearable device. The cloud computing system may additionally use account or subscription information/data to identify a destination for routing the voice call. In one embodiment, the cloud computing system may monitor the status of the voice call and may route the voice call to a second destination, based on the status of the voice call.

Figure 1:
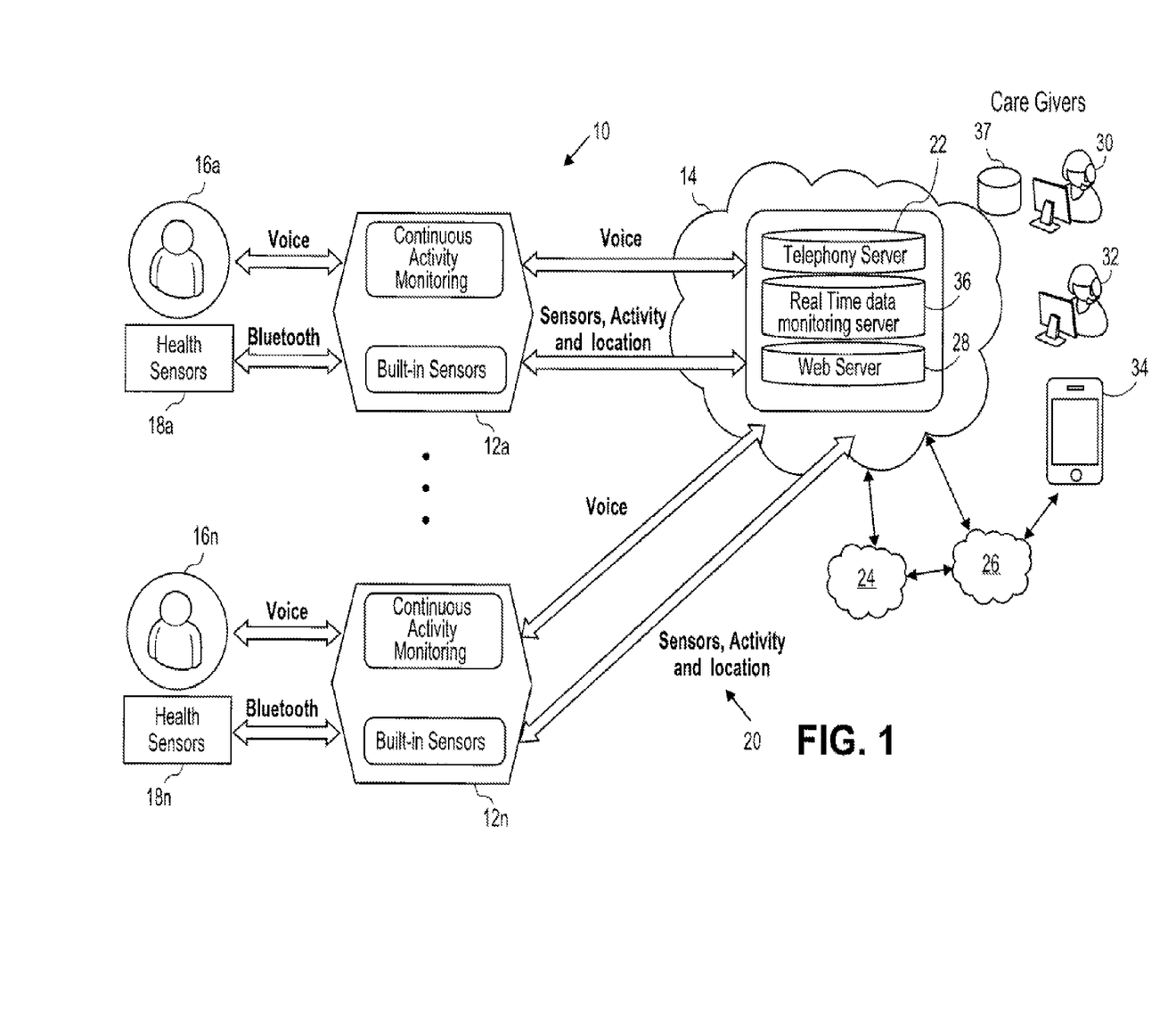
FIG. 1 is a block diagram illustrating one embodiment of a system for detecting a predefined user state.

FIG. 1 is a block diagram illustrating one embodiment of a system 10 for detecting a predefined user state. The system 10 includes wearable devices 12a-12n communicatively connected to a distributed cloud computing system 14. A wearable device 12 may be a small-size computing device that can be worn as a watch, a pendant, a ring, a pager, or the like, and can be held in any orientation.

In one embodiment, each of the wearable devices 12a-12n is operable to communicate with a corresponding one of users 16a-16n (e.g., via a microphone, speaker, and voice recognition software), external health sensors 18a-18n (e.g., an EKG, blood pressure device, weight scale, glucometer) via, for example, a short-range over the air (OTA) transmission method (e.g., BlueTooth, WiFi, etc.), a call center 30, a first-to-answer system 32, and care giver and/or family member 34, and the distributed cloud computing system 14 via, for example, a long range OTA transmission method (e.g., over a $3^{rd}$ Generation (3G) or $4^{th}$ Generation (4G) cellular transmission network 20, such as a Long Term Evolution (LTE) network, a Code Division Multiple Access (CDMA) network, etc.).

Each wearable device 12 is configured to detect a predefined state of a user. The predefined state may include a user physical state (e.g., a user fall inside or outside a building, a user fall from a bicycle, a car incident involving a user, a user taking a shower, etc.) or an emotional state (e.g., a user screaming, a user crying, etc.). As will be discussed in more detail below, the wearable device 12 may include multiple sensors for detecting a predefined user state. For example, the wearable user device 12 may include an accelerometer for measuring an acceleration of the user, a magnetometer for measuring a magnetic field associated with the user's change of orientation, a gyroscope for providing a more precise determination of orientation of the user, and a microphone for receiving audio. Based on data received from the above sensors, the wearable device 12 may identify a suspected user state, and then categorize the suspected user state as an activity of daily life, a confirmed predefined user state, or an inconclusive event. The wearable user device 12 may then communicate with the distributed cloud computing system 14 to obtain a re-confirmation or change of classification from the distributed cloud computing system 14. In another embodiment, the wearable user device 12 transmits data provided by the sensors to the distributed cloud computing system 14, which then determines a user state based on this data.

In one embodiment, the wearable device 12 includes a low-power processor (e.g., low-power processing device) to process data receive from sensors and/or detect anomalous sensor inputs. The low-power processor may cause a second processing device to further analyze the sensor inputs (e.g., may wake up a main CPU). If the second processing device determines that there is possibly an anomalous event in progress the second processing device may send dataset to the distributed cloud computing system 14. In one embodiment, if the distributed cloud computing system 14 concludes there is an anomalous event, the distributed cloud computing system 14 may instruct the wearable device 12 to initiate a voice call.

In one embodiment, the wearable user device 12 may also obtain audio data from one or more microphones on the wearable device 12. For example, the wearable user device 12 may record the user's voice and/or sounds which are captured by the one or more microphones, and may provide the recorded sounds and/or voice to the distributed cloud computing system 14 for processing (e.g., for voice or speech recognition).

In one embodiment, the wearable devices 12a-12n may continually or periodically gather/obtain data from the sensors and/or the one or more microphones (e.g., gather/obtain datasets and audio data) and the wearable devices 12a-12n may transmit these datasets to the distributed cloud computing system 14. The datasets may be transmitted to the distributed cloud computing system 14 at periodic intervals, or when a particular event occurs (e.g., user pushes a button on the wearable device 12a-12n or a fall is detected). In one embodiment, the datasets may include data indicative of measurements or information obtained by the sensors which may be within or coupled to the wearable device 12-12n. For example, the datasets may include temperature readings (e.g., 98.5 degrees Fahrenheit, measurements obtained from an accelerometer (e.g., a rate of acceleration), a GPS location (e.g., GPS or longitude/latitude coordinates), etc. In one embodiment, the wearable device 12a-12n may transmit a dataset per sensor (e.g., one dataset for the accelerometer, one data set for an aGPS receiver, etc.) In another embodiment, the wearable device 12a-12n may combine data received from multiple sensors into a dataset.

Cloud computing provides computation, software, data access, and storage services that do not require end-user knowledge of the physical location and configuration of the system that delivers the services. The term "cloud" refers to one or more computational services (e.g., servers) connected by a computer network.

The distributed cloud computing system 14 may include one or more computers configured as a telephony server 22 communicatively connected to the wearable devices 12a-12n, the Internet 24, and one or more cellular communication networks 20, including, for example, the public circuit-switched telephone network (PSTN) 26. The distributed cloud computing system 14 may further include one or more computers configured as a Web server 28 communicatively connected to the Internet 24 for permitting each of the users 16a-16n to communicate with a call center 30, first-to-answer systems 32, and care givers and/or family 34. The web server 28 may also provide an interface for users to interact with the distributed cloud computing system 14 (e.g., to access their accounts, profiles, or subscriptions, to access stored datasets and/or audio data, etc.) The distributed cloud computing system 14 may further include one or more computers configured as a real-time data monitoring and computation server 36 communicatively connected to the wearable devices 12a-12n for receiving measurement data (e.g., datasets), for processing measurement data to draw conclusions concerning a potential predefined user state, for transmitting user state confirmation results and other commands back to the wearable devices 12a-12n, for storing and retrieving present and past historical predefined user state data from a database 37 which may be employed in the user state confirmation process, and in retraining further optimized and individualized classifiers that can in turn be transmitted to the wearable device 12a-12n. In one embodiment, the web server 28 may store and retrieve present and past historical predefined user state data, instead of the real-time data monitoring and computation serve 36 or the database 37.

In one embodiment, the wearable devices 12a-12n may include a button, which a user 16 may use to initiate voice calls. For example, a user 16a may push the button on the device 12a to initiate a voice call in order to obtain assistance or help (e.g., because the user has slipped or fallen, or because the user requires medical assistance). As discussed above, the wearable devices 12a-12n may periodically transmit datasets to the distributed cloud computing system 14. In one embodiment, the wearable devices 12a-12n may also transmit datasets to the distributed cloud computing system 14 when the user press or pushes the button on the wearable devices 12a-12n. In one embodiment, the wearable devices 12a-12n may be single-button devices (e.g., devices which only have one button) which provide a simplified interface to users.

In one embodiment, the distributed cloud computing system 14 may receive a request from the wearable device 12a-12n to initiate the voice call. The distributed cloud computing system 14 may also receive datasets from the wearable device 12a-12n associated with an event experienced by the user. After receiving the request to initiate the voice call, the distributed cloud computing system 14 may analyze the datasets to determine whether the event experienced by the user is an activity of daily life (ADL), a confirmed fall, or an inconclusive event. In another embodiment, the distributed cloud computing system 14 may identify a destination for routing the voice call, based on the analysis of the datasets. For example, if the distributed cloud computing system 14 analyzes the datasets and determines that the event is a confirmed fall, the distributed cloud computing system 14 may identify a first-to-answer system 32 (e.g., a 911 or emergency response call center) as destination for the voice call. In another example, if the distributed cloud computing system 14 analyzes the datasets and is unable to determine what event occurred (e.g., an inconclusive event), the distributed cloud computing system 14 may identify a family member 24, as destination for the voice call. After identifying a destination for the voice call, the distributed cloud computing system 14 routes the voice call to the identified destination.

In one embodiment, the distributed cloud computing system 14 may also analyze audio data received from a wearable device 12 to determine what event has happened to a user. For example, the wearable device 12 may provide audio data (e.g., a recording of the user's voice or other sounds) to the distributed cloud computing system 14. The distributed cloud computing system 14 may analyze the sound data and may determine that a user is asking for help (e.g., based on the user's words in the recording). The distributed cloud computing system 14 may identify a destination for the voice call, based on the audio data and/or the datasets received from the wearable device 12 and may route the voice call to the identified destination. The audio data may be used in conjunction with the datasets to identify a destination for routing the voice call.

In another embodiment, the distributed cloud computing system 14 may monitor the status of the voice call, after it routes the voice call to the identified destination. For example, the distributed cloud computing system 14 may route (either automatically or based on an input from an administrator or call center agent) the voice call to a family member 34. The distributed cloud computing system 14 may monitor the voice call and may determine that the family member 34 did not answer the voice call. The distributed cloud computing system 14 may then route the voice call to a second destination (e.g., to a call center 30), based on the status of the voice call (e.g., based on the voice call failing to connect at the first destination).

In one embodiment, the distributed cloud computing system 14 may also use subscription data (e.g., information associated with a user's account or subscription to a service) to identify destinations for routing the voice call. For example, a user may have a higher tier/level subscription which specifies that voice calls initiated by the user (via the button on the wearable device 12) should be routed to a live person, such as a call center 30 or a first-to-answer system 32 (e.g., a 911 response center). In another example, a user may have a lower tier/level subscription which specifies that voice calls initiated by the user (via the button on the wearable device 12) should be routed to family member 34 first, and then to a call center 30 if the family member 34 is not able to answer the voice call. The subscription data may be used in conjunction with the datasets and/or audio data to identify a destination for routing the voice call.

In a further embodiment, the distributed cloud computing system 14 may also use a time of day and/or a geographic location to identify destinations for routing a voice call. For example, if a request to initiate a voice all is received in the evening (e.g., 7:00 PM), the distributed cloud computing system 14 may route the voice call to a call center 30, but if a request to initiate a voice call is received during the morning (e.g., 10:30 AM), the distributed cloud computing system 14 may route the voice call to a family member 34. In a further example, the distributed cloud computing system 14 may determine that the wearable device 12 (which is worn by the user 16) is not located within the home of the user 16 (e.g., the user 16 has left or is outside of a specific geographic region such as the user's home), and may route the voice call to a call center 30. If the wearable device 12 is located within the user's home, the distributed cloud computing system 14 may route the voice call to a family member 34.

Figure 2:
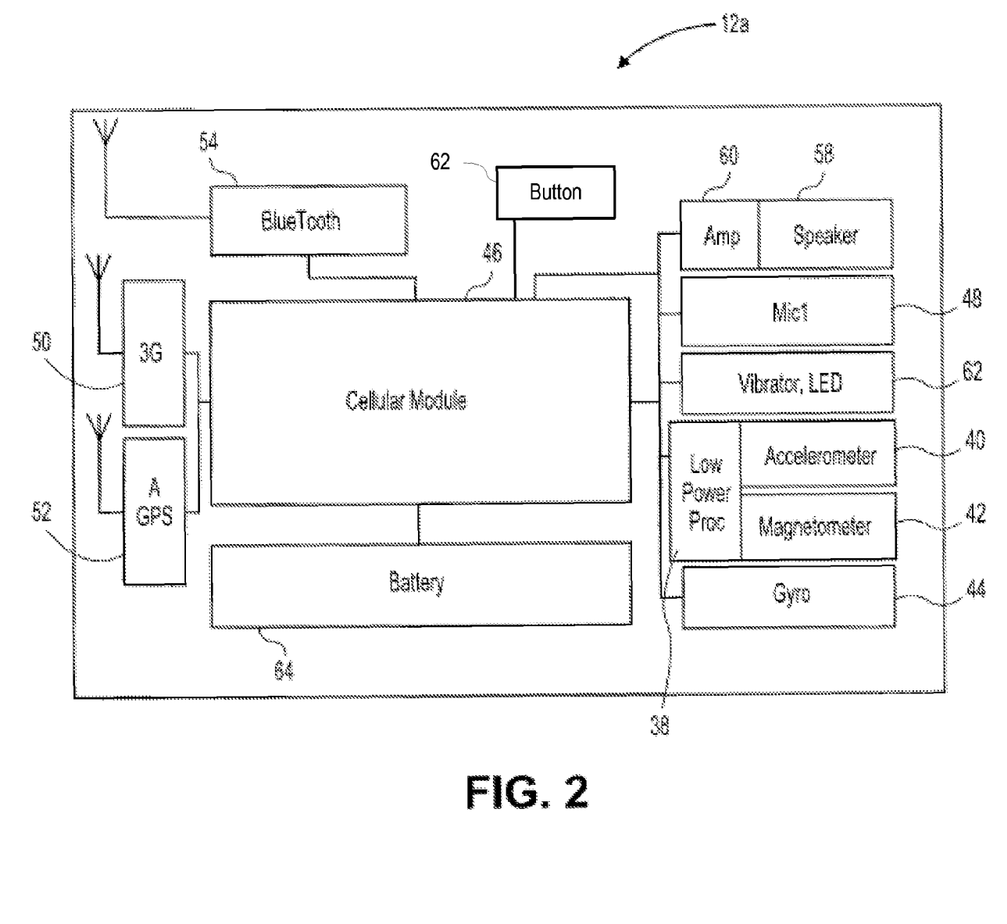
FIG. 2 is a block diagram illustrating one embodiment of a wearable device.

FIG. 2 is a block diagram illustrating one embodiment of a wearable device 12a (e.g., wearable device 12a shown in FIG. 1). The wearable device 12a may include a low-power processor 38 communicatively connected to an accelerometer 40 (e.g., a two-or more-axis accelerometer) for detecting acceleration events (e.g., high, low, positive, negative, oscillating, etc.), a magnetometer 42 (preferably a 3-axis magnetometer) for assessing an orientation of the wearable device 12a, and a gyroscope 44 for providing a more precise determination of orientation of the wearable device 12a. The low-power processor 38 is configured to receive continuous or near-continuous real-time measurement data from the accelerometer 40, the magnetometer 42, and the gyroscope 44 for rendering tentative decisions concerning predefined user states. By utilizing the above components, the wearable device 12 is able to render these decisions in relatively low-computationally expensive, low-powered manner and minimize false positive and false negative errors. A cellular module 46, such as the 3G IEM 6270 manufactured by Qualcomm®, includes a high-computationally-powered microprocessor element and internal memory that are adapted to receive the suspected fall events from the low-power processor 38 and to further correlate orientation data received from the optional gyroscope 44 with digitized audio data received from one or more microphones 48 (preferably, but not limited to, a micro-electro-mechanical systems-based (MEMS) microphone(s)). The audio data may include the type, number, and frequency of sounds originating from the user's voice, the user's body, and the environment.

The cellular module 46 is also configured to receive commands from and transmit data to the distributed cloud computing system 14 via a 3G, 4G, and/or other wireless protocol transceiver 50 over the cellular transmission network 20. The cellular module 46 is further configured to communicate with and receive position data from an aGPS receiver 52, and to receive measurements from the external health sensors (e.g., sensors 18a-18n shown in FIG. 1) via a short-range Blue-Tooth transceiver 54 (or other equivalent short range transceiver such as a WiFi transceiver) or via a direct connection to one or more health sensors (e.g., the health sensors may be directly attached/coupled to the wearable device 12a).

In addition to recording audio data for fall analysis, the cellular module 46 is further configured to permit direct voice communication between the user 16a and the PSAP (e.g. 9-1-1, an emergency response center, etc., not shown in the figures), a call center 30, first-to-answer systems 32 (e.g. a fire station, a police station, a physician's office, a hospital, etc.), or care givers and/or family 34 via a built-in speaker 58 and an amplifier 60. Either directly or via the distributed cloud computing system 14, the cellular module 46 is further configured to permit the user 16a to conduct a conference connection with one or more of a PSAP, the call center 30, the first-to-answer systems 32, and/or care givers and/or family 34. The cellular module 46 may receive/operate one or more input and output indicators 62 (e.g., one or more mechanical and touch switches (not shown), a vibrator, LEDs, etc.). The wearable device 12a also includes an on-board battery power module 64.

The wearable device 12a may also include a button 62. The button 62 may allow a user to provide user input to the wearable device 12a. For example, the user may press or push the button to initiate a voice call to one or more of a call center 30, first-to-answer systems 32 (e.g. a fire station, a police station, a physician's office, a hospital, etc.), or care givers and/or family 34. In another example, a user may use the button 62 to answer questions during a voice call (e.g., push the button 62 once for "yes" and push the button 62 twice for "no"). In another example, the user may indicate that the wearable device should start collecting data (e.g., datasets such as health data, audio data, location data, etc.) and/or send data to the distributed cloud computing system 14, using the button 62.

The wearable device 12a may also include empty expansion slots and/or connectors (not shown) to collect readings from other sensors (i.e., an inertial measurement unit, a pressure sensor for measuring air pressure or attitude, a heart rate sensor, blood perfusion sensor, temperature sensor), etc. These other sensors may be coupled to the device via the expansion slots and/or connectors to provide additional datasets or information to the distributed cloud computing system 14.

In one embodiment, the wearable device 12a may collect, gather, and/or obtain information using a variety of components. For example, the wearable device 12a may obtain orientation and/or movement data (e.g., information about how a user who is wearing the wearable device 12a has moved) using the accelerometer 40, the magnetometer 42, and/or the gyroscope 44. In another example, the wearable device 12a may determine the location (e.g., location data, such as GPS coordinates) of the wearable device 12a (and the user who is wearing or holding the wearable device 12a) using the aGPS receiver 52. In a further example, the wearable device may collect health data (e.g., heart rate, blood pressure, sugar levels, temperature, etc.) using sensors (not shown in the figures) which may be attached to the wearable device 12a and/or may communicate with the wearable device 12a using the Bluetooth transceiver 54. In yet another example, the wearable device 12a may obtain audio data (e.g., voice and/or sounds) using the microphone 48 or a plurality of microphones (now shown in the figures).

In one embodiment, the wearable device 12a may obtain and/or generate datasets (e.g., orientation/movement data, health data, location data, audio data) using these components and may transmit these datasets to the distributed cloud computing system 14. In another embodiment, the wearable device 12a may periodically transmit data sets to the distributed cloud computing system 14. For example, the wearable device 12a may transmit the datasets once every 5 seconds, or once every 30 seconds. In another embodiment, the wearable device 12a may transmit the datasets when certain criteria are met (e.g., when an accelerometer detects an acceleration above a certain threshold indicating a possible fall, or when the aGPS receiver determines that the wearable devices has left a certain location). In a further embodiment, the wearable device 12a may transmit datasets when a user input is received. For example, the wearable device 12a may send the datasets when the user presses or pushes the button 62, in order to initiate a voice call.

In one embodiment, the wearable device 12a may process the datasets, prior to providing the datasets to the distributed cloud computing system 14. For example, the wearable device 12a may process motion and/or orientation data to make an initial determination as to whether a user event (e.g., a fall or some other accident) has occurred. The distributed cloud computing system 14 may further process the datasets, in addition to the processing performed by the wearable device 12a. In another embodiment, the wearable device 12a may provide the datasets to the distributed cloud computing system 14 without first processing the datasets, and may allow the distributed cloud computing system 14 to process the datasets. In one embodiment, the distributed cloud computing system 14 may have more processing power (e.g., more CPUs) and may be better able to process and/or analyze the datasets than the wearable device 12a.

Figure 3:
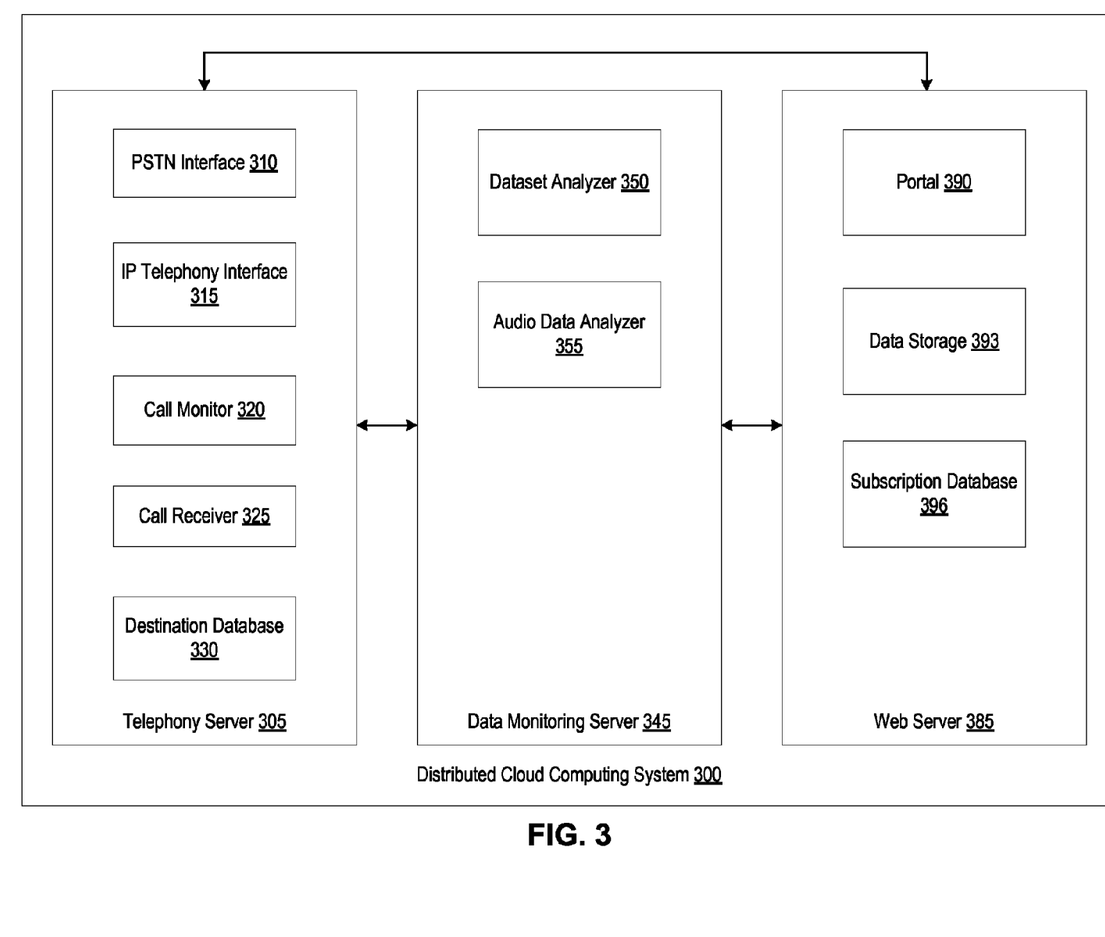
FIG. 3 is a block diagram illustrating one embodiment of a distributed cloud computing system.

FIG. 3 is a block diagram illustrating one embodiment of a distributed cloud computing system 300. The distributed computing system 300 may include a telephony server 305, a data monitoring server 345, and a web server 385. More or less components may be included in the distributed cloud computing system 300 without loss of generality.

The telephony server 305 may receive requests from users/wearable devices to initiate voice calls (e.g., user pushes a button on the wearable device to initiate a voice call) and may route the voice calls to one or more destinations, based on datasets such as audio data, health data, movement/orientation data, and location data, received from a wearable device. The telephony server 305 includes a call receiver 325, a PSTN interface 310, an IP telephony interface 315, and a call monitor 320.

The call receiver 325 may receive the request from the user (e.g., from the wearable device) to initiate the voice call. For example, the user may push button on the wearable device to initiate a voice call and the call receiver 325 may receive the request to initiate the voice call from the wearable device. In one embodiment, the wearable device may provide the datasets (e.g., via a data connection) directly to the data monitoring server 345 and/or the web server 385 for processing. In an alternative embodiment, the call receiver 325 may receive datasets from the wearable device and forward them to the data monitoring server 345 and/or the web server 385 for processing. The call receiver 325 may provide the datasets to the data monitoring server 345 for processing. The data monitoring server 345 may analyze the datasets and/or audio data received from the wearable device to determine whether an event experienced by a user is an ADL, a confirmed fall, or an inconclusive event, as discussed in more detail below. Based on the determination about the event, the data monitoring server 345 may instruct the telephony server 305 to route the voice call to one or more destinations. For example, if the data monitoring server 345 determines that an event is a fall, the data monitoring server 345 may instruct the telephony server 305 to route the call to a first-to-answer system or to an emergency call center. In another example, if the data monitoring server 345 determines that an event is an ADL, the data monitoring server 345 may instruct the telephony server 305 to route the call to a family member, a general call center, or an automated answering service. Destinations may include, but are not limited to, landline telephones, cellular telephones, IP phones, call centers, first-to-answer systems, and/or public safety access points (PSAPs) (e.g., 9-1-1 emergency services, an automated emergency call center, etc.).

The PSTN interface 310 may route the call to a public circuit-switched telephone network (e.g., a landline telephone). For example, the PSTN interface 310 may be used to route the call to a person's home phone number. The IP telephony interface 315 may route the call to an IP telephone system. The IP telephony interface 315 may also encode/decode audio data (e.g., analog voice data) into digital data. In one embodiment, one or more of the PSTN interface 301 and the IP telephony interface 315 may route a voice call to a cellular phone network (e.g., route the call to a cellular phone).

The call monitor 320 may monitor the status of a call (e.g., whether a call is answered by the destination, whether a call is dropped, monitor voice quality, etc.). Based on the status of the call, the telephony server 305 may route the call to a second destination. For example, if a call is routed to a first destination (e.g., a family member's cell phone), and call monitor 320 determines that the call was not answered, the telephony server may re-route the call to a second destination (e.g., a call center). In another example, if the call monitor 320 determines that a call was dropped (e.g., a cell phone call drops), the call monitor 320 may re-route the call to a second destination (e.g., from a family member's cell phone to a first-to-answer system. The destination database 330 may store a list of destinations (e.g., a list of phone numbers, call centers, etc.) which may be used to route the voice call. In one embodiment, the telephony server 305 may route voice calls using the list of destinations stored in the destination database 330. In another embodiment, the data monitoring server 345 may provide the telephony server 305 with a destination to use for routing the voice call.

As discussed above, the data monitoring server 345 may analyze and/or process datasets (such as location data, health data, time data, orientation/movement data, etc.) and/or audio data to determine whether an event experienced by a user is an ADL, a confirmed fall or other accident, or an inconclusive event. The data monitoring server 345 includes a dataset analyzer 350 and an audio data analyzer 355.

The dataset analyzer 350 may analyze the datasets provided by the wearable device to classify an event and/or determine what event occurred. For example, the dataset analyzer 350 may analyze motion data (e.g., acceleration, change in direction or orientation, etc.) to determine whether a user has fallen. In another example, the dataset analyzer 350 may also use health data (e.g., elevated heart rate, increase in body temperature) to determine whether a user has fallen or experienced some other type of accident or event. In a further example, the dataset analyzer 350 may analyze location data (e.g., GPS coordinates) to identify where an event occurred. This may allow the distributed computing system to route a voice call to a destination (e.g., a call center) geographically close to the location of the event or to route the voice call to the nearest family member. The audio data analyzer 355 may analyze audio data (e.g., voices or sounds) to determine whether an event such as a fall or an accident has occurred. For example, the audio data analyzer 355 may analyze the speech of a user (e.g., may determine whether a user is yelling for help). The data monitoring serve 345 may also provide an interactive voice response system which may be used to gather user input to help determine whether an event such as a fall or an accident has occurred. For example, the interactive voice response system may ask the user "do you require medical attention" or "have you suffered an accident." A user may provide answers or feedback using the wearable device (e.g., using the microphones/speakers in the wearable device) and the audio data analyzer 355 may process the user's answers or feedback.

The web server 385 may provide an external interface for users to interact with the distributed cloud computing system 300. The web server 385 includes a portal 390 (e.g., a web portal or other type of interface/application), a data storage 393, and a subscription database 396. The web server 385 may allow a user to update subscription information (e.g., change to a higher or lower subscription), view datasets and audio data stored on the data monitoring server 345, and/or set preferences for destinations when routing voice calls.

The subscription database 396 may store information or data related to user subscriptions and accounts. In one embodiment, the subscription database 396 may store data related to the level of service a user is subscribed to. For example, a user may have a higher level (e.g., premium) subscription which indicates that calls should be routed to a PSAP, rather than routed to an automated call center. In another example, a user may have a lower level (e.g., lower tier) subscription which indicates that a call should be routed to a family member first, and that the call should be routed to a PSAP only if the family member does not answer the call. The subscription database 396 may also store rules and/or preferences for determining destinations for routing a voice call. For example, the subscription database 396 may store a rule indicating that at certain times of the data, voice calls should be routed to different destinations. In another example, the subscription database 396 may store a rule which indicates different destinations based on the type of the event (e.g., whether the event is a fall, an ADL, or an inconclusive event).

The data storage 393 may store datasets, audio data, and/or other data received from the wearable devices. The datasets and data stored in the data storage 393 may be used to maintain a record of events and activities which a user experiences.

In one embodiment, the web server 385 and the data monitoring server 345 may store information and may process/use information using representational state transfer architecture (REST). In another embodiment, the web server 385 and the data monitoring server 345 may store information and may process/use information user other types of systems such as relational databases, hierarchical databases, etc.

In one embodiment, the telephony server 305 may receive destinations for routing voice calls from the data monitoring server 345. In another embodiment, the telephony server 305 may use the analysis or determinations obtained by the data monitoring server 345 (e.g., by analyzing data sets and/or audio data) and may identify which destination should be used for routing the voice calls. Although the telephony server 305, the data monitoring server 345, and the web server 385 are shown as separate servers, in other embodiments, one or more of the telephony server 305, the data monitoring server 345, and the web server 385 could be combined into a single device (e.g., a single server).

Figure 4:
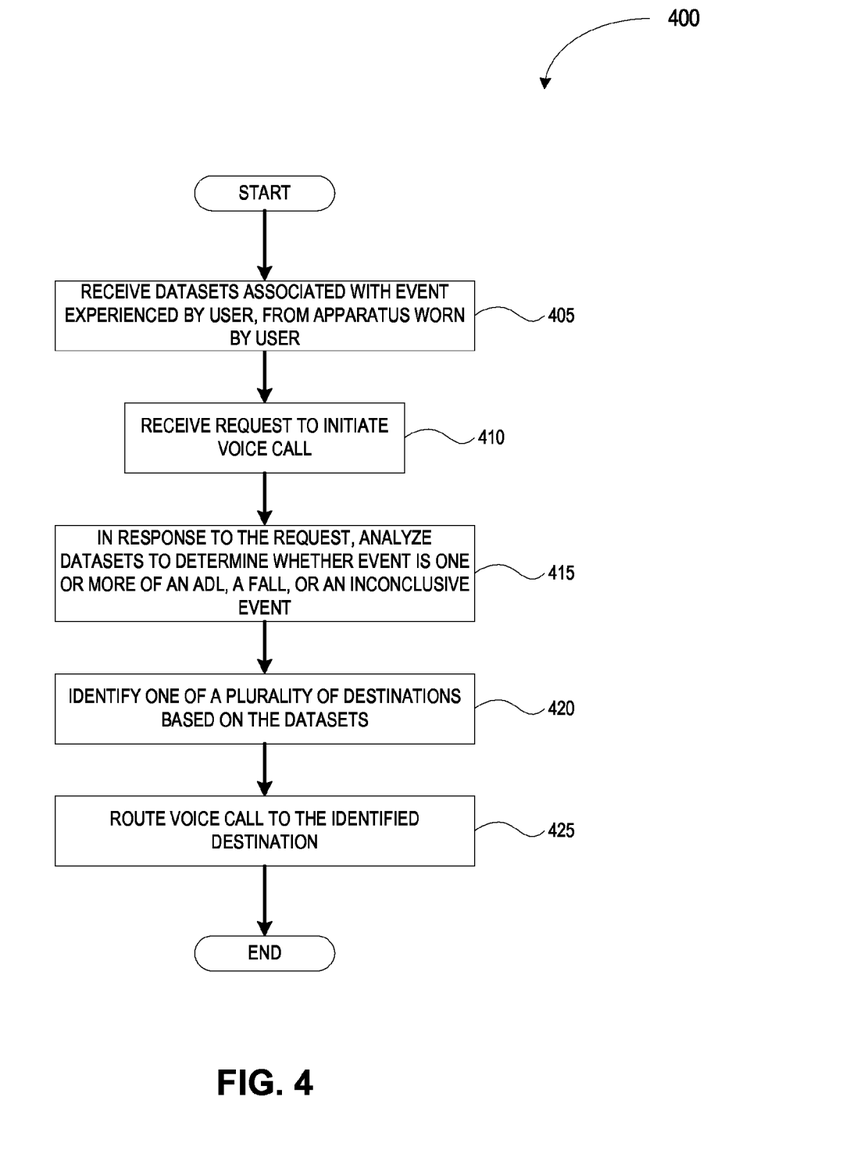
FIG. 4 is a flow diagram illustrating a method of routing calls, according to one embodiment.

FIG. 4 is a flow diagram illustrating a method 400 of routing calls, according to one embodiment. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 400 is performed by computing system (e.g., the distributed cloud computing system 14 of FIG. 1 or the telephony server 22 of FIG. 1).

Referring to FIG. 4, the method 400 starts with the computing system receiving datasets associated with an event experienced by a user (block 405). As discussed above, the datasets may be transmitted periodically to the computing system from a wearable device, or may be transmitted in response to a user input (e.g., user pushes a button on the wearable device). At block 410, the computing system receives a request to initiate a voice call. For example, the user may push a button on the wearable device and the wearable device may send a request to initiate a voice call to the computing system. In response to the request, the computing system may analyze one or more datasets to determine whether the event experienced by the user is an ADL, a confirmed fall or other type of accident, and/or inconclusive, at block 415. For example, the computing system, may analyze the datasets to determine whether a user has slipped or fallen (e.g., whether move data indicates a sudden increase in acceleration or change in orientation). In another example, the computing system may also analyze health data (e.g., heart rate, blood pressure, etc.) to determine what type of event the user has experienced. In a further example, the computing system may use location data (e.g., the GPS location of a user) and/or the time of day to determine what type of event the user has experienced.

In one embodiment, the computing system may employ machine learning when processing and/or analyzing datasets. The computing system may initially process "training" datasets in order to "train" the computing system. For example, the computing system may process the training datasets, which may have expected results. The computing system may be trained to reach the expected results (e.g., the computing system may store rules, thresholds, state machines, etc., generated using the training datasets). The computing system may also use user input to refine the processing and/or analyzing of the datasets. For example, a user (e.g., an administrator) may analyze datasets and classify an event. The computing system may store associate the datasets with the event type and may use this association when processing future datasets.

At block 420, the computing system identifies one of a plurality of destinations, based on the datasets. For example, the computing system may determine that the datasets indicated a fall or other type of accident, and the computing system may identify a PSAP as a destination for routing the voice call. In another example, the computing system may determine that the datasets indicate an ADL, and may identify a call center or an automated answering service as a destination for routing the voice call. The computing system routes the voice call to the identified destination at block 425.

Figure 5:
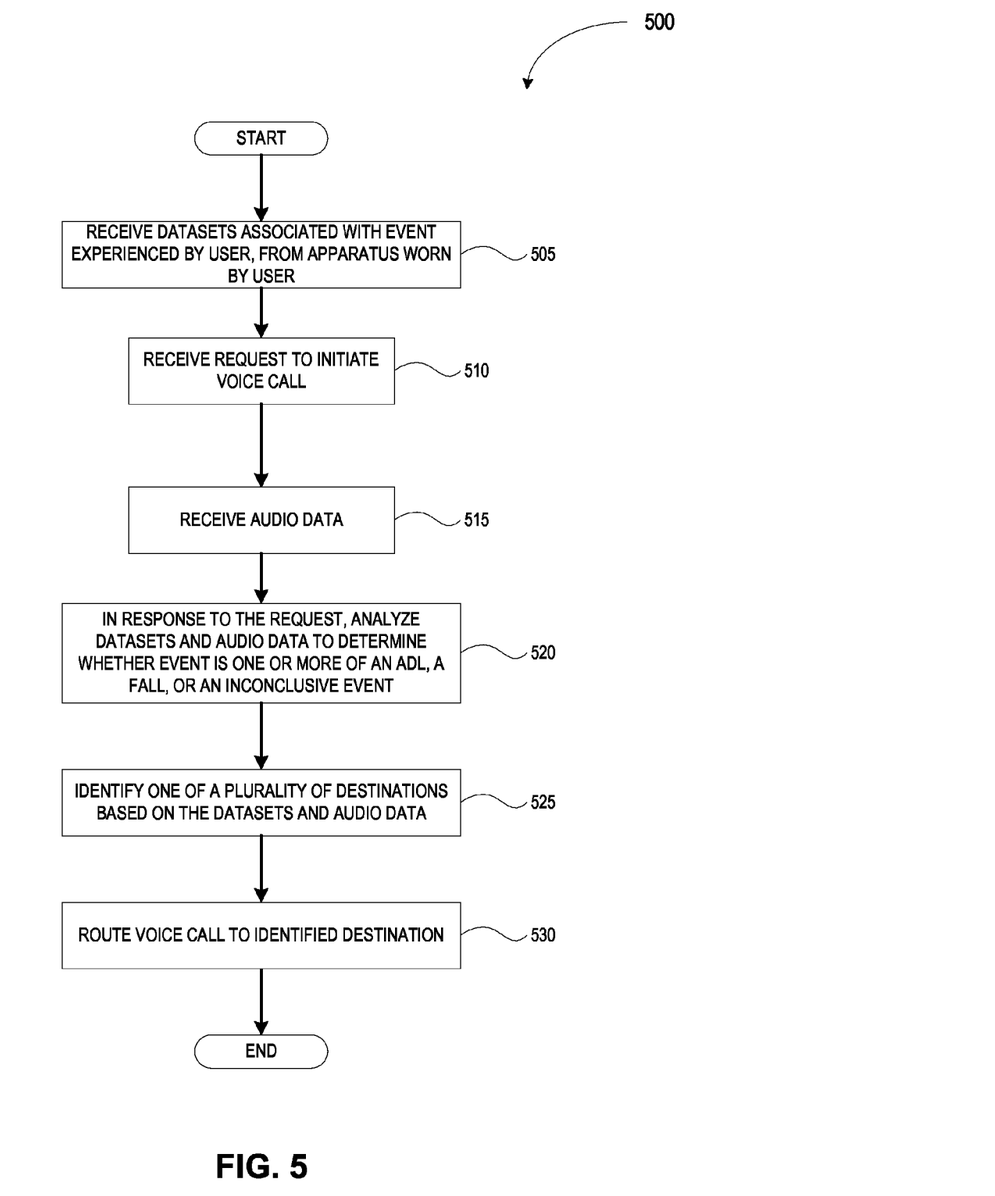
FIG. 5 is a flow diagram illustrating a method of routing calls, according to another embodiment.

FIG. 5 is a flow diagram illustrating a method 500 of routing calls, according to another embodiment. The method 500 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 500 is performed by computing system (e.g., the distributed cloud computing system 14 of FIG. 1 or the telephony server 22 of FIG. 1).

Referring to FIG. 5, the method 500 starts with the computing system receiving datasets associated with an event experienced by a user (block 505). At block 510 the computing system receives a request to initiate a voice call. For example, the user may push a button on the wearable device and the wearable device may send a request to initiate a voice call to the computing system. The computing system receives audio data from the wearable device at block 515. For example, the computing system may receive recorded voices and/or sounds which the wearable device records after the user pushes a button to initiate a voice call. In response to the request, the computing system may analyze one or more datasets and the audio data to determine whether the event experienced by the user is an ADL, a confirmed fall or other type of accident, and/or inconclusive, at block 520. For example, one or more of health data, orientation/movement data, location data, time data (e.g., the time of day) may be used to determine what type of event the user experienced. In one embodiment, the computing system may process the audio data to determine what type of event the user experienced. For example, the audio data may include a user's cries for help, and the computing system may process the audio data and determine that the event was a fall or other type of accident. In another example, if the audio data indicates that the user is not speaking or making any noises, the computing system may determine that the user is unconscious and unable to respond, and may determine that a fall or other type of accident has occurred.

At block 525, the computing system identifies one of a plurality of destinations, based on the datasets and the audio. For example, the computing system may determine that the datasets and audio data indicated a fall or other type of accident (e.g., based on a sudden change in orientation and a user's cries for help), and the computing system may identify a PSAP as a destination for routing the voice call. The computing system routes the voice call to the identified destination at block 530.

Figure 6:
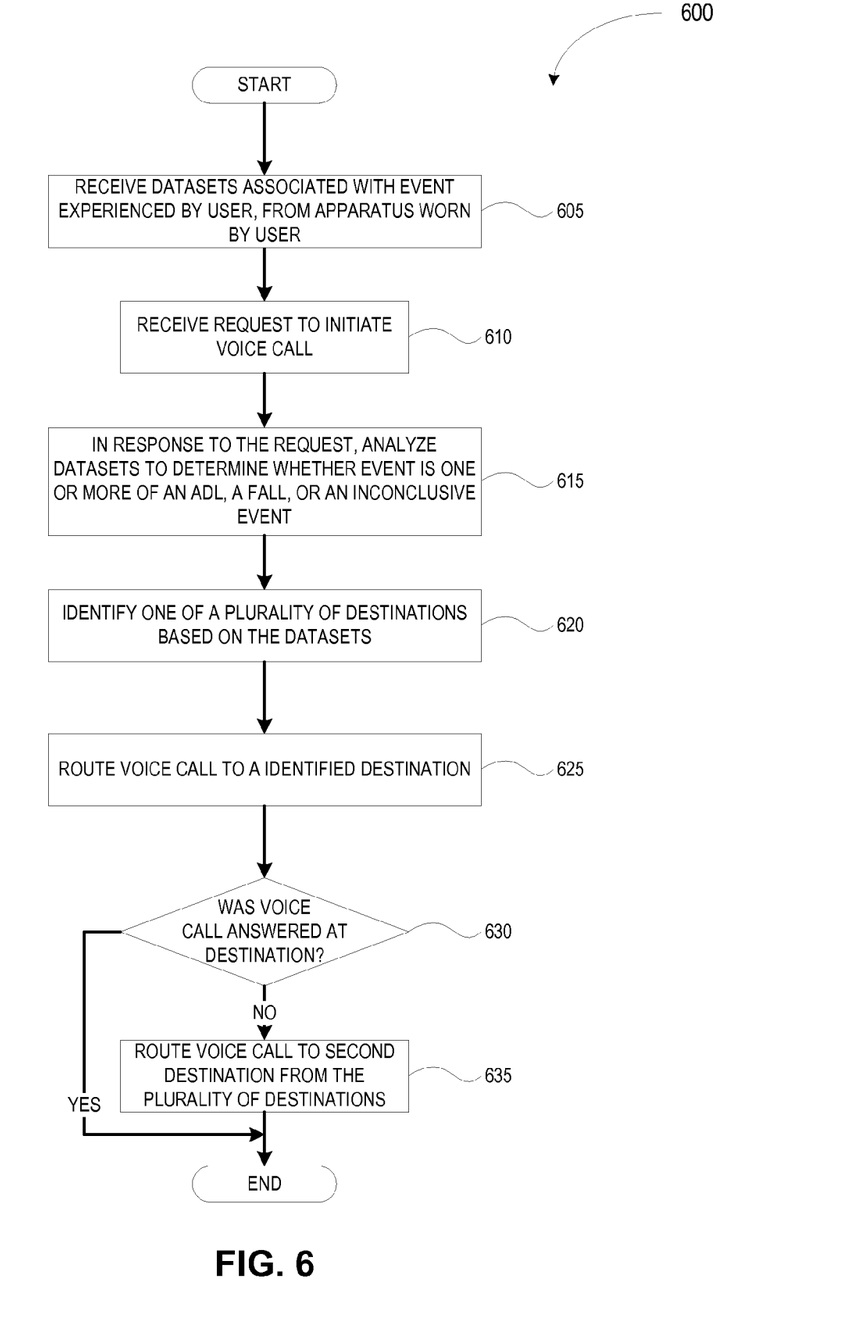
FIG. 6 is a flow diagram illustrating a method of routing calls, according to a further embodiment.

FIG. 6 is a flow diagram illustrating a method 600 of routing calls, according to a further embodiment. The method 600 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 600 is performed by computing system (e.g., the distributed cloud computing system 14 of FIG. 1 or the telephony server 22 of FIG. 1).

Referring to FIG. 6, the method 600 starts with the computing system receiving datasets associated with an event experienced by a user (block 605). At block 610, the computing system receives a request to initiate a voice call. In response to the request, the computing system may analyze one or more datasets to determine whether the event experienced by the user is an ADL, a confirmed call or other type of accident, and/or inconclusive, at block 615. At block 620, the computing system identifies one of a plurality of destinations, based on the datasets. The computing system routes the voice call to the identified destination at block 625.

At block 630, the computing system monitors the status of the call to determine whether the voice call was answered at the identified destination. If the voice call was answered at the first destination, the method 600 ends. If the voice call was not answered at the first destination, the computing system routes the voice call to a second destination from the plurality of destinations at bock 635. In one embodiment, the computing system may identify the second destination based on one or more of a user's subscription (e.g., subscription/account information), rules or preferences associated with the destinations, datasets (e.g., location data, health data, orientation data, etc.) received from the wearable device, and audio data received from the wearable device.

Figure 7:
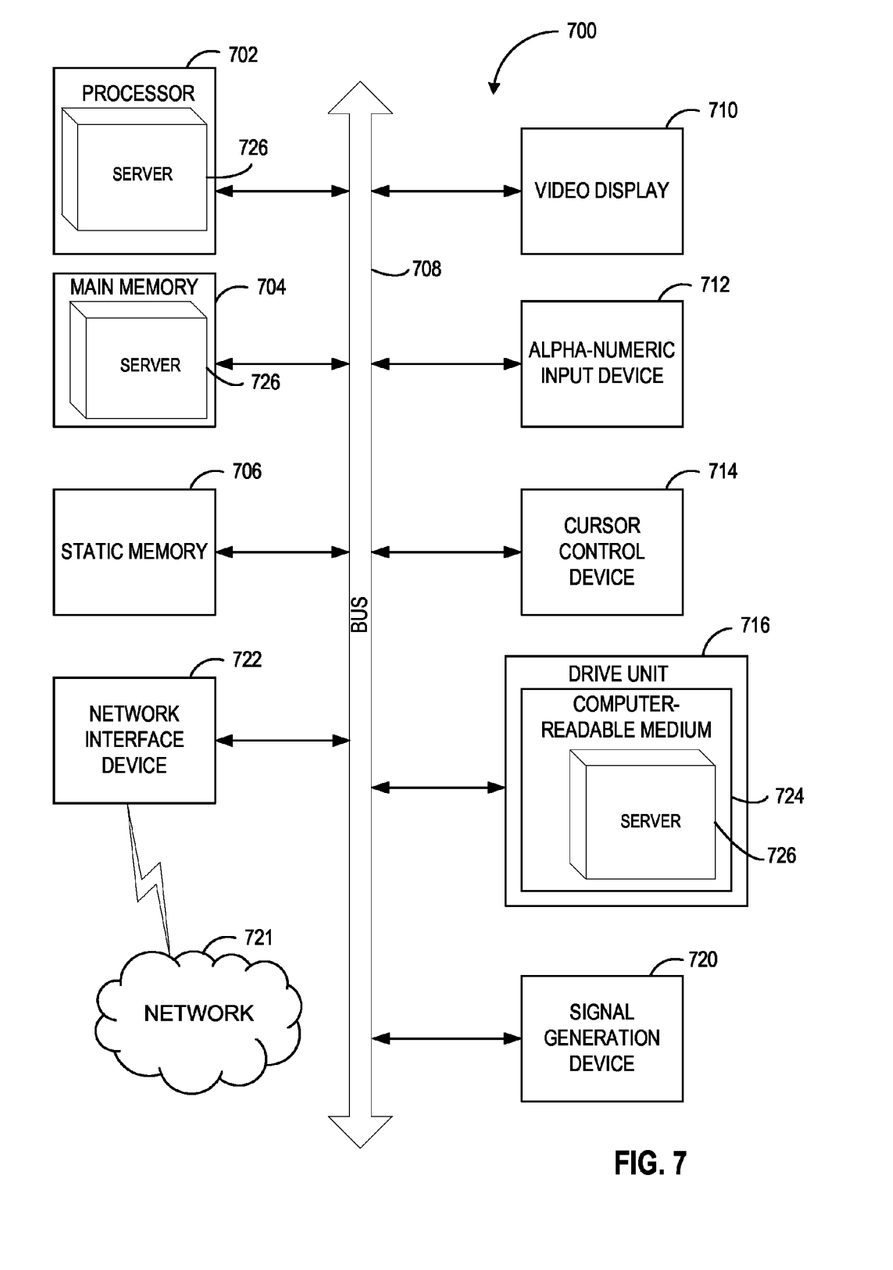
FIG. 7 is a block diagram of an exemplary computer system that may perform one or more of the operations described herein.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a smart phone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 716, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker). In one embodiment, the video display 710, the alpha-numeric devices 712 and the cursor control device 714 may be combined into a single device, such as a touch screen.

The data storage device 716 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 721 via the network interface device 722.

In one embodiment, the instructions 726 may include instructions to execute a server such as the telephony server 22, the real time data monitoring server 36, and/or the web server 28 of FIG. 1. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "initiating", "identifying", "receiving", "analyzing", "routing," "monitoring", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving datasets from an apparatus worn by a user, wherein the datasets are associated with an event experienced by the user;
in response to a request from the user to initiate a voice call, analyzing the datasets to determine whether the event comprises one or more of an activity of daily life (ADL), a confirmed fall, and an inconclusive event;
identifying one of a plurality of destinations based on the analysis of the datasets; and
routing the voice call to the identified destination.

2. The method of claim 1, wherein the datasets comprise one or more of health data associated with the user, location data associated with the apparatus, time data, and orientation data associated with the apparatus.

3. The method of claim 1, wherein the apparatus comprises a single-button apparatus.

4. The method of claim 1, wherein:
receiving the datasets comprises receiving audio data from the apparatus;
analyzing the datasets comprises analyzing the audio data to determine whether the event comprises one or more of an activity of daily life (ADL), a confirmed fall, and an inconclusive event; and
identifying the one of a plurality of destinations is based on the analysis of the audio data.

5. The method of claim 1, further comprising:
monitoring a status of the voice call after routing voice call to the first destination;
identifying a second destination, based on the status of the voice call; and
routing the voice call to the second destination.

6. The method of claim 5, wherein routing the voice call to the second destination is further based on subscription data associated with the user.

7. The method of claim 1, wherein routing the voice call to the first destination is further based on subscription data associated with the user.

8. A system comprising:
a processing device to:
receive datasets from an apparatus worn by a user, wherein the datasets are associated with an event experienced by the user;
in response to a request from a user to initiate a voice call, analyze the datasets to determine whether the event comprises one or more of an activity of daily life (ADL), a confirmed fall, and an inconclusive event;
identify one of a plurality of destinations based on the analysis of the datasets; and
route the voice call to the identified destination.

9. The system of claim 8, wherein the datasets comprise one or more of health data associated with the user, location data associated with the apparatus, time data, and orientation data associated with the apparatus.

10. The system of claim 8, wherein the apparatus comprises a single-button apparatus.

11. The system of claim 8, wherein the processing device is to:
receive the datasets by receiving audio data from the apparatus;
analyze the datasets by analyzing the audio data to determine whether the event comprises one or more of an activity of daily life (ADL), a confirmed fall, and an inconclusive event; and
identify the one of a plurality of destinations based on the analysis of the audio data.

12. The system of claim 8, wherein the processing device is further to:
monitor a status of the voice call after routing voice call to the first destination;
identify a second destination, based on the status of the voice call; and
route the voice call to the second destination.

13. The system of claim 8, wherein routing the voice call to the first destination is further based on subscription data associated with the user.

14. The system of claim 12, wherein routing the voice call to the second destination is further based on subscription data associated with the user.

15. A non-transitory computer readable medium including instructions that, when executed by a processor, causes the processor to perform operations comprising:
receiving datasets from an apparatus worn by a user, wherein the datasets are associated with an event experienced by the user;
in response to a request from the user to initiate a voice call, analyzing the datasets to determine whether the event comprises one or more of an activity of daily life (ADL), a confirmed fall, and an inconclusive event;
identifying one of a plurality of destinations based on the analysis of the datasets; and
routing the voice call to the identified destination.

16. The non-transitory computer-readable medium of claim 15, wherein the datasets comprise one or more of health data associated with the user, location data associated with the apparatus, time data, and orientation data associated with the apparatus.

17. The non-transitory computer-readable medium of claim 15, wherein:
receiving the datasets comprises receiving audio data from the apparatus;
analyzing the datasets comprises analyzing the audio data to determine whether the event comprises one or more of an activity of daily life (ADL), a confirmed fall, and an inconclusive event; and
identifying the one of a plurality of destinations is based on the analysis of the audio data.

18. The non-transitory computer-readable medium of claim 15, the operations further comprising:
monitoring a status of the voice call after routing voice call to the first destination;
identifying a second destination, based on the status of the voice call; and
routing the voice call to the second destination.

19. The non-transitory machine readable storage computer-readable medium of claim 15, wherein routing the voice call to the first destination is further based on subscription data associated with the user.

20. The non-transitory computer-readable medium of claim 18, wherein routing the voice call to the second destination is further based on subscription data associated with the user.

* * * * *

UNITED STATES PATENT AND TRADEMARK OFFICE
CERTIFICATE OF CORRECTION

PATENT NO. : 8,811,964 B2  Page 1 of 1
APPLICATION NO. : 13/439571
DATED : August 19, 2014
INVENTOR(S) : Fish et al.

It is certified that error appears in the above-identified patent and that said Letters Patent is hereby corrected as shown below:

In the claims

In column 16, line 50, in Claim 19, after "non-transitory", delete "machine readable storage", therefor Signed and Sealed this
Twenty-fourth Day of May, 2016

Michelle K. Lee
*Director of the United States Patent and Trademark Office*